(12) United States Patent
Scragg et al.

(10) Patent No.: US 7,854,449 B2
(45) Date of Patent: Dec. 21, 2010

(54) COMPOSITE LAMINATED SHEET MATERIAL FOR CONTAINMENT SUMPS

(75) Inventors: Richard Raymond Scragg, Edmonton (CA); Ronald James Fink, Edmonton (CA); Etienne Vezina, Edmonton (CA)

(73) Assignee: ZCL Composites Inc., Edmonton (CA)

( * ) Notice: Subject to any disclaimer, the term of this patent is extended or adjusted under 35 U.S.C. 154(b) by 326 days.

(21) Appl. No.: 11/307,978

(22) Filed: Mar. 1, 2006

(65) Prior Publication Data
US 2006/0276094 A1 Dec. 7, 2006

(51) Int. Cl.
| | |
|---|---|
| F16L 35/00 | (2006.01) |
| F16L 47/02 | (2006.01) |
| F16L 11/00 | (2006.01) |
| F16L 55/18 | (2006.01) |
| F16L 55/16 | (2006.01) |
| B32B 27/12 | (2006.01) |
| E04B 1/16 | (2006.01) |
| B29C 73/00 | (2006.01) |
| B27N 3/10 | (2006.01) |
| D21J 3/00 | (2006.01) |

(52) U.S. Cl. .................. 285/21.2; 285/18; 285/21.1; 285/21.3; 442/67; 138/145; 138/97; 138/98; 138/99; 264/34; 264/36.16; 264/257; 264/324

(58) Field of Classification Search .......... 442/59, 442/64–67, 180; 138/144–146, 97–99, 172, 138/174; 264/34, 36.16, 257, 324; 285/18, 285/21.1, 21.2, 21.3, 30
See application file for complete search history.

(56) References Cited

U.S. PATENT DOCUMENTS

| | | | | |
|---|---|---|---|---|
| 4,104,095 A | * | 8/1978 | Shaw | 156/83 |
| 4,347,090 A | * | 8/1982 | Anderson et al. | 156/149 |
| 4,727,242 A | * | 2/1988 | Barfield | 219/535 |
| 4,992,228 A | | 2/1991 | Heck et al. | |
| 5,057,353 A | | 10/1991 | Maranci et al. | |
| 5,496,602 A | | 3/1996 | Wai | |
| 5,590,803 A | | 1/1997 | Kaempen | |
| 5,870,871 A | * | 2/1999 | Stewart | 52/575 |
| 6,864,195 B2 | * | 3/2005 | Peng | 442/41 |
| 2003/0234057 A1 | * | 12/2003 | Woolstencroft et al. | 138/125 |
| 2005/0249872 A1 | * | 11/2005 | Cox et al. | 427/230 |
| 2005/0281970 A1 | * | 12/2005 | LaMarca et al. | 428/36.1 |

FOREIGN PATENT DOCUMENTS

| | | |
|---|---|---|
| WO | 99/30073 | 6/1999 |
| WO | 00/56524 | 9/2000 |
| WO | 03/022020 | 3/2003 |
| WO | 03/029710 | 4/2003 |
| WO | 2004/031640 | 4/2004 |
| WO | 2004/079245 | 9/2004 |

* cited by examiner

Primary Examiner—Angela Ortiz
Assistant Examiner—Jennifer Steele
(74) Attorney, Agent, or Firm—Bennett Jones LLP

(57) ABSTRACT

The present invention is a composite laminated sheet material suitable for structures such as containment sumps. The laminated material comprises a fabric-backed thermoplastic layer upon which thermoset plastic is applied to the fabric side. The thermoplastic layer is formed by contacting a layer of fabric onto a layer of molten thermoplastic such that the liquid thermoplastic permeates a portion of the fabric layer to form a mechanical bond with the fabric layer when the thermoplastic layer cools and hardens. Thermoset plastic, such as fibreglass resin, is sprayed onto the fabric side of the thermoplastic layer to allow the liquid resin to permeate the fabric layer. Once the resin cures and hardens, the fabric layer is mechanically bonded to the cured thermoset plastic layer to effectively bond the thermoplastic layer to the thermoset plastic layer.

8 Claims, 6 Drawing Sheets

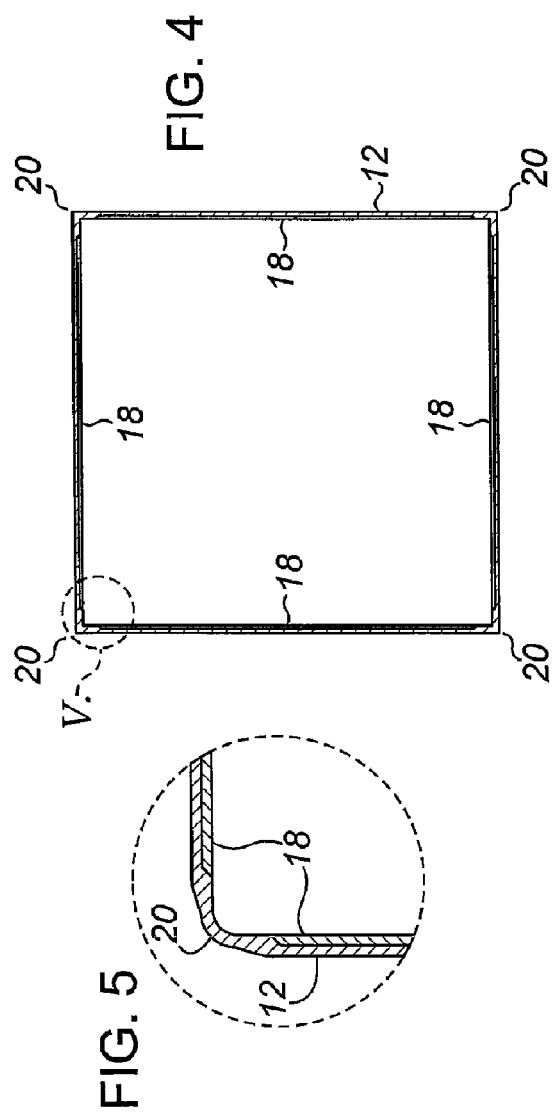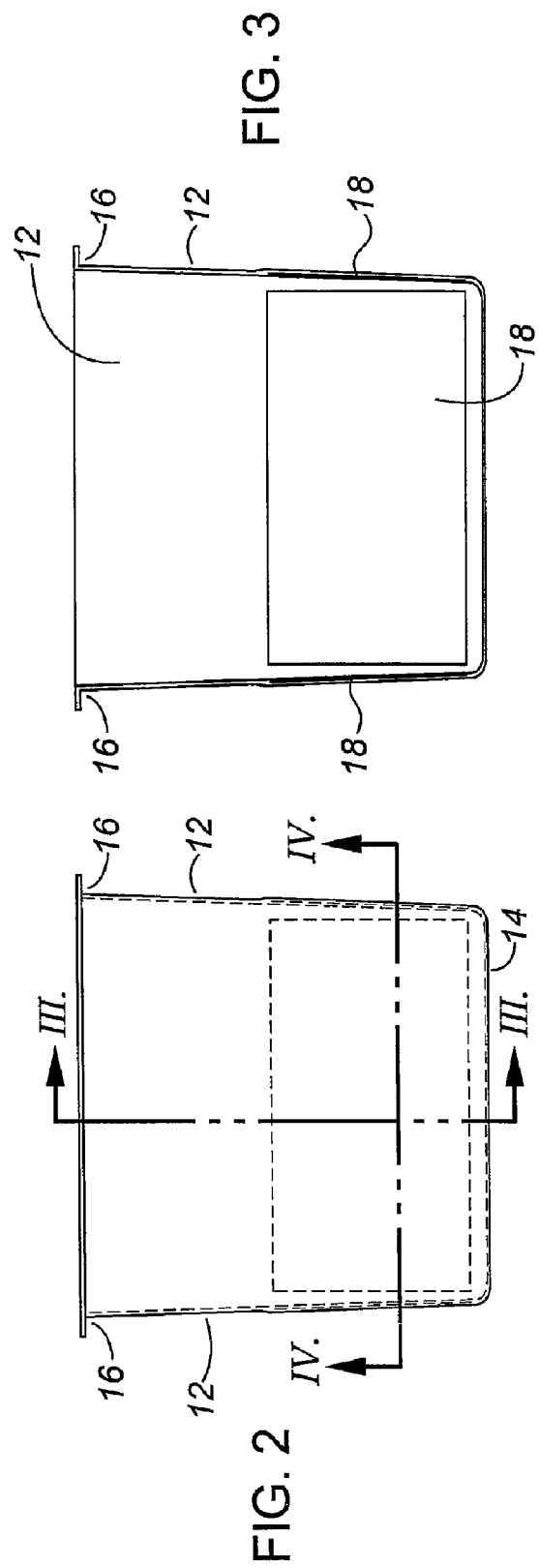

COMPOSITE LAMINATED SHEET MATERIAL FOR CONTAINMENT SUMPS

CROSS REFERENCE TO RELATED APPLICATIONS

This application claims the priority benefit of Canadian Patent Application 2,499,849 filed on Mar. 9, 2005 entitled "Composite Laminated Sheet Material for Containment Sumps", the contents of which are incorporated herein by reference.

FIELD OF THE INVENTION

The present invention relates to the field of composite laminated sheet material for use in forming containment sumps, specifically, composite laminated sheet material comprising of thermoplastic and thermoset plastic layers.

BACKGROUND OF THE INVENTION

Containment sumps are typically used with subterranean piping systems such as those used at gasoline service stations to move fuel or other liquid chemicals from an underground storage tank to an above-ground dispensing station. Underground storage tanks and the associated piping systems pose serious potential environmental and fire hazards if the fuel or liquid chemicals leak from the tanks and/or the piping systems into the ground.

Operators of such tanks and piping systems are aware of these potential risks and realize that a priority must be given to the planning and construction of the infrastructure if underground storage tanks and piping systems, especially for gasoline service stations. The development of piping systems made of plastic materials have enabled cost-effective and environmentally-friendly alternatives to steel piping systems that can rust and corrode over time.

In gasoline service station installations, the piping systems running between an underground storage tank and the gasoline pumps will typically pass through containment sumps, one located above the storage tank and one located beneath each gasoline pump. The containment sump beneath a gasoline pump is an open-top container with a closed bottom to catch any leaked liquids whereas the containment sump mounted on top of an underground storage tank has both an open top and is mounted directly to the top of the underground storage tank. The top of the tank forms the bottom of the sump. Containment sumps, when viewed from the top, may be square, rectangular, circular, octagonal or any other desired shape. Apertures in the sidewalls of the containment sumps permit pipes to pass through. A common material used in the construction of containment sumps is fibreglass reinforced plastic such as resin or other polymeric materials.

Other precautions taken to overcome environmental risks include a secondary containment system for piping systems from underground storage tanks to gasoline dispensing pumps. This involves each primary fuel supply pipe being placed in a secondary containment pipe that may be sealed at the ends of the field supply and pipeline. The secondary pipes prevent fuel leaking from a primary fuel pipe to escape into the environment and convey any leaking fuel to a remote sensing device. The secondary pipes are separate from the primary pipes and are sleeved over the primary pipes when they are installed between the underground storage tanks and the gasoline pumps.

To prevent the ingress of water into containment sumps through the pipe apertures in the sump sidewalls, it is necessary to seal the junction between the pipe and the sump sidewall. One method used to accomplish this is to attach a fitting or pipe entry boot to a portion of the sump wall around the aperture and to place a rubber "boot" that fits concentrically about the pipe. The boot is clamped to both the pipe and the fitting using, for example, Jubilee™ clips. Some types of fitting are bolted to the sump sidewall where other types comprise inner and outer parts that sandwich the sump sidewall by having the inner and outer parts fastened to each other by a screw-threaded connector that extends through the aperture. These connectors often include a rubber seal located between a portion of the connector and the sump sidewall. Neither of these type of fittings provides a completely effective seal between the pipe and a sump sidewall.

Over time, both types of seals can allow water to leak into the containment sump and accumulate. For containment sumps located on top of an underground storage tank, this makes maintenance of the sump bottom and tank entrance very difficult. In addition to allowing the ingress of water, defective seals between pipes and sump sidewalls can allow gasoline and/or vapours to escape the sump into the environment. It would be preferable if a pipe fitting could be chemically bonded (solvent welded) or electro-fusion welded to both the pipe and the sump sidewall. However, there does not exist a fitting capable of being welded to both plastic pipes and fibreglass-reinforced plastic containment sumps.

It is, therefore, desirable to have a composite laminated sheet material for constructing a containment sump that enables a pipe entry fitting or boot to be welded to both a pipe and the sump sidewall.

SUMMARY OF THE INVENTION

The present invention is concerned with a composite laminated sheet material suitable for structures, in particular, containment sumps. The sheet material comprises a thermoplastic layer having a fabric backing on one side, and a layer of thermoset plastic bonded to the fabric side of the thermoplastic layer. The thermoplastic layer may be made of polyethylene, polypropylene, polyvinylchloride, polyamide, polyvinylidene fluorid, ethylenchlortrifluorethylene, Teflon™ or nylon but is, preferably, made of polyethylene. The thermoset plastic layer is, preferably, a fibreglass-reinforced plastic such as polyester resin, vinyl ester resin, epoxy resin or phenolic resin.

Having a thermoplastic made of polyethylene makes it possible to have a polyethylene pipe entry boot, such as those described in British patent document GB2332255, to be electro-fusion welded to the thermoplastic layer, said boot disposed about an aperture through the composite sheet material. The polyethylene pipe entry boot can then be electro-fusion welded to a polyethylene pipe passing through the aperture and the boot. Alternatively, the pipe boot and the thermoplastic layer can be chemically bonded to one another using a solvent welding technique as well known to those skilled in the art. Either way, a complete seal can be made between the pipe and the thermoplastic layer.

In construction, the composite sheet material can have the thermoplastic layer on either side of a pump sidewall but is, preferable to have the thermoplastic layer on the interior side of the sump sidewall. The thermoplastic layer itself is created by contacting a layer of fabric on a thermoplastic layer that is in a molten or liquid state. In this manner, the liquid thermoplastic can seep into or permeate at least a portion of the thickness of the fabric layer. Once the thermoplastic layer cools and hardens, the fabric layer is firmly mechanically bonded to the thermoplastic layer.

To construct a containment sump made of the composite sheet material of the present invention, panels of fiber-backed thermoplastic are placed on the sides of the containment sump mold, the fiber-backed side facing away from the mold surface. Fibreglass-reinforced thermoset plastic is then applied onto the panels and the mold to form the containment sump. The liquid resin of the applied fibreglass-reinforced plastic seeps into and permeates the fabric layer of the thermoplastic panels to form a strong mechanical bond once the fibreglass-reinforced plastic has cured. Preferably, the method of application comprises spraying liquid fibreglass-reinforced plastic onto the thermoplastic panels and the mold.

To use the containment sump with piping systems, apertures suitable for pipe to pass through are cut through the composite layer sidewall of the sump. A thermoplastic pipe entry boot is placed on the thermoplastic side of the sump sidewall and centered about the aperture. A pipe made of the same thermoplastic, such as polyethylene, is passed through the aperture and the pipe entry boot. A complete seal can be made between the pipe and the thermoplastic layer by chemically bonding/solvent-welding or electro-fusion welding the boot to the thermoplastic layer and then the pipe to the boot.

While the present invention is concerned with containment sumps, it is envisioned that the composite laminated sheet material of the present invention may be used in the construction of storage tanks, process vessels or any other structure that may have thermoplastic pipes passing through the sidewalls of such structures.

Broadly stated, one aspect of the present invention is a composite laminated material, comprising: a layer of thermoplastic having a layer of fabric bonded to substantially all of one side of said thermoplastic layer; and liquid thermoset plastic applied to said fabric layer whereby said liquid thermoset plastic permeates said fabric layer, and whereupon said liquid thermoset plastic curing to a thermoset plastic layer, said fabric layer bonds said thermoplastic layer to said thermoset plastic layer.

Another aspect of the present invention is a composite laminated material suitable for bonding to a thermoplastic pipe entry boot, comprising: a layer of a first thermoplastic having a layer of fabric bonded to substantially all of one side of said thermoplastic layer; liquid thermoset plastic applied to said fabric layer whereby said liquid thermoset plastic permeates said fabric layer, and whereupon said liquid thermoset plastic curing to a thermoset plastic layer, said fabric layer bonds said thermoplastic layer to said thermoset plastic layer; and whereupon forming an opening through said composite laminated material suitable for passing a pipe made of said first thermoplastic through and bonding a pipe entry boot made of said first thermoplastic to said thermoplastic layer side of said composite material disposed about said opening, said bonded pipe entry boot is capable of providing a leak-proof seal between said composite laminated material and said pipe situated in said pipe entry boot and said opening.

Yet another aspect of the present invention is a method for fabricating a structure made of a composite laminated material, the method comprising the steps of: providing a mold for forming said structure, said structure comprising a sidewall; placing a piece of fabric-backed thermoplastic sheet material on the portion of said mold for forming said sidewall, said fabric-backed side of said thermoplastic sheet material facing away from said mold; applying liquid thermoset plastic onto said mold and said fabric-backed thermoplastic sheet material to form said structure; and allowing said applied thermoset plastic to at least partially cure before removing said structure from said mold.

BRIEF DESCRIPTION OF THE DRAWINGS

FIG. 2 is a side elevational view of a containment sump comprising the present invention.

FIG. 3 is a side elevational view of section A-A of FIG. 2.

FIG. 4 is a top plan view of section B-B of FIG. 2.

FIG. 5 is a close up top view of a sidewall corner in section B-B of FIG. 2.

DESCRIPTION OF THE PREFERRED EMBODIMENT

The present invention is a composite laminated sheet material used in the construction of containment sumps.

Figure 1B:
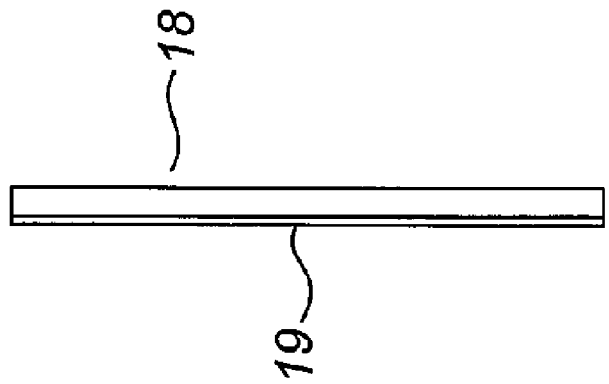
FIG. 1B is a side elevational view of a thermoplastic insert used in the present invention.
Figure 1A:
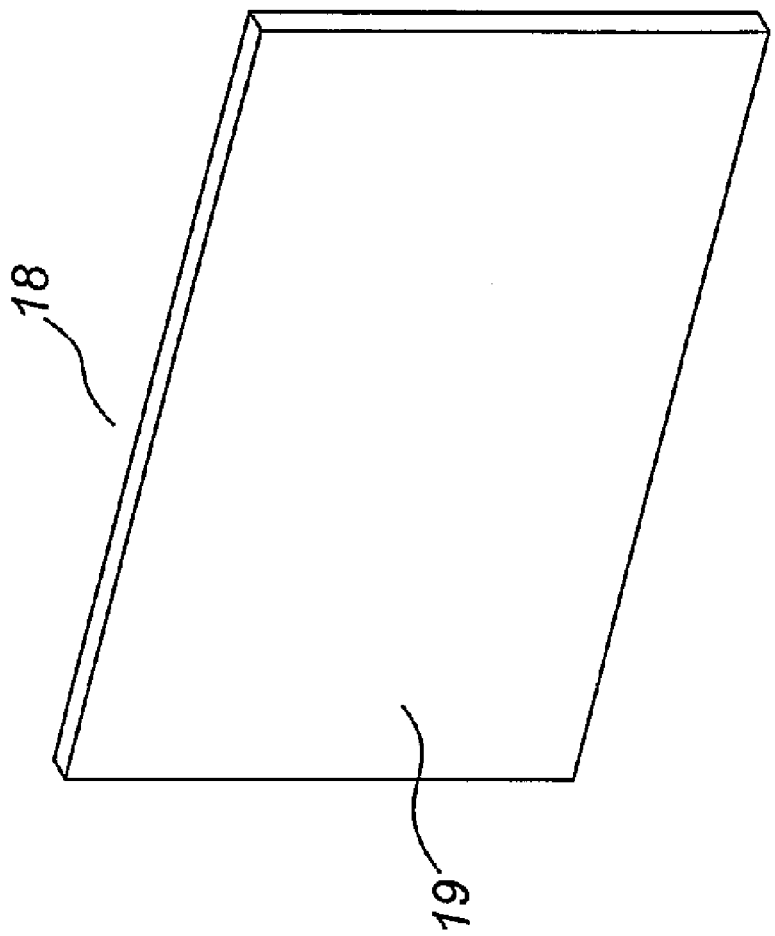
FIG. 1A is an isometric view of a thermoplastic insert for use in the present invention.

Referring to FIGS. 1A and 1B, insert 18 for use in the present invention is shown. Insert 18 is made of a thermoplastic. Examples of thermoplastics that can be used to form insert 18 include polyethylene, polypropylene, polyvinylchloride, polyvinyidine fluorid, polyamide, ethylenchlortrifluorethylene, Teflon™ and nylon. Preferably, insert 18 is made of polyethylene.

As shown in FIGS. 1A and 1B, insert 18 has fabric side 19. The fabric used on insert 18 may be made of polypropylene, polyester or glass. Preferably, fabric side 19 is polyester. Exemplary examples of insert 18 is a fabric-backed high density polyethylene sheet material as manufactured by Agru Kunststofftechnik GmbH of Bad Hall, Austria sold under the product name "PE 80 Black". Insert 18 is, preferably, formed from 5 mm thick sheets of PE 80 Black.

Referring to FIGS. 2 to 5, containment sump 10 is shown. Sump 10 is made with the composite laminate sheet material of the present invention. Sump 10 comprises sidewalls 12 and bottom 14 to form an open-topped container. Sidewalls 12 and bottom 14 are made of a thermoset plastic, preferably, fibreglass-reinforced resin or polymeric material. Insert 18 is laminated to sidewall 12 of sump 10. The manner in which insert 18 is laminated to sidewall 12 will be discussed in further detail below. Insert 18 may be laminated to the exterior or interior side of sidewall 12. In the examples described within the specification, insert 18 is laminated to the interior side of sidewall 12 but it should obvious to those skilled in the art that it would be possible to laminate insert 18 to the exterior side of sump 10 as well.

Figure 6:
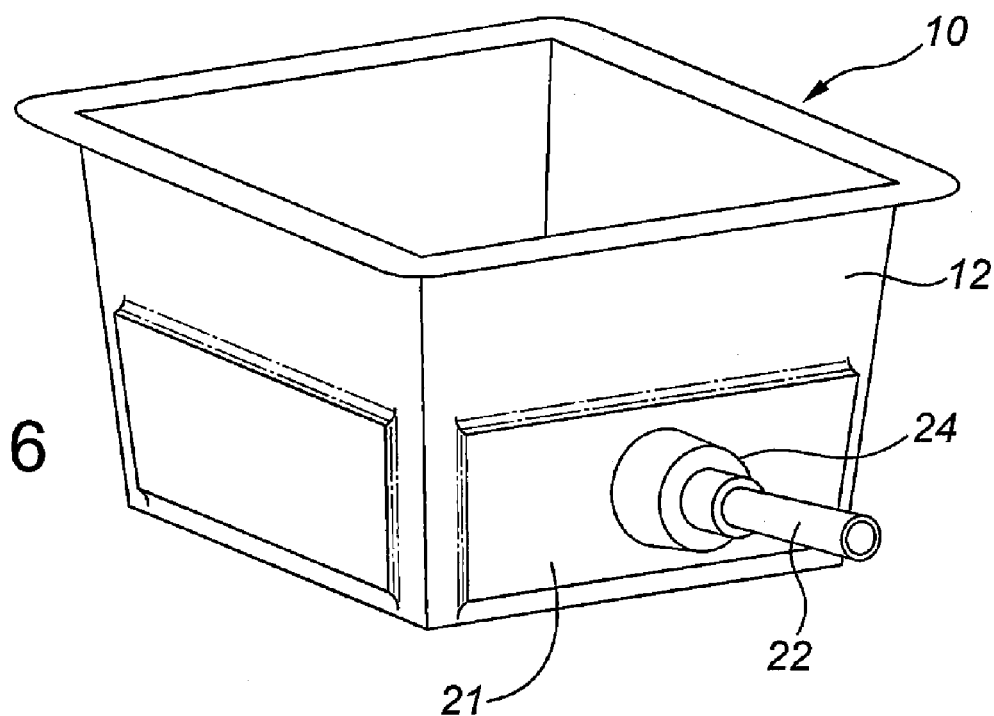
FIG. 6 is an isometric exterior view of a containment sump comprising the present invention with a pipe entering the sump via a pipe entry boot fitting.
Figure 7:
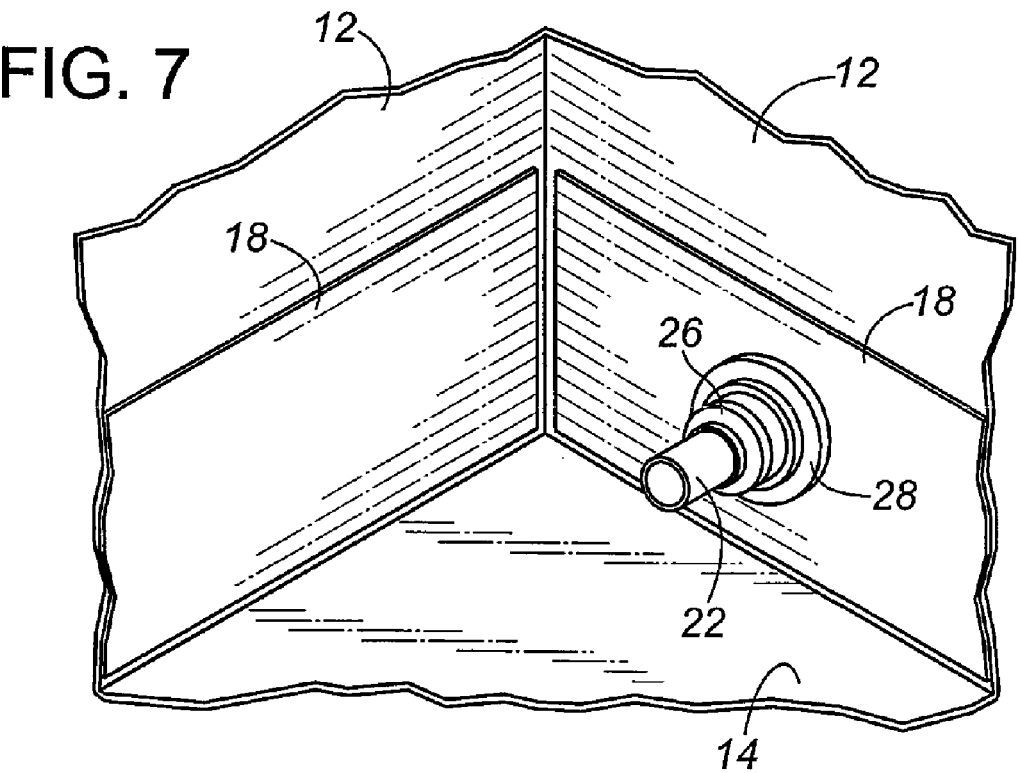
FIG. 7 is an isometric interior view of a containment sump comprising the present invention with a pipe entering the sump via a pipe entry boot fitting.

Referring to FIGS. 4 and 5, insert 18 does not extend around the interior corner 20 of sump 10. This is done to simplify the lamination of insert 18 to sidewall 12. However, it should be noted that insert 18 may also be placed continuously about the interior or exterior of sump 10 if the requisite time and effort is taken to form insert 18 in that fashion. Referring to FIG. 6, sump 10 is shown with mounting surface 21 on sidewall 12. Mounting surface 21 is the portion of sidewall 12 where insert 18 is placed on the interior side of sidewall 12. On mounting surface 21, outer pipe entry boot 24 is placed on sidewall 12 to allow pipe 22 to pass through outer pipe entry boot 24 and an opening (not shown) into the interior space of sump 10, as shown in FIG. 7. Referring to FIG. 7, insert 18 is shown on sidewall 12. Sump 10 may have insert 18 placed only on one sidewall 12 or any number of sidewalls 12 that form sump 10. Insert 18 may also be placed on bottom 14. Inner pipe entry boot 26 is attached to outer pipe entry boot 24 through the opening (not shown) with insert 18 sandwiched between them. Inner boot 26 further comprises boot flange 28. Preferably, inner boot 26, outer boot 24 and flange 28 are all made of the same thermoplastic material that insert 18 is made of, namely, polyethylene. Exemplary examples of suitable pipe entry boots are those as described in international patent applications PCT/GB98/03698, PCT/GB98/04503, PCT/GB2003/004286 and PCT/GB2004/00931.

Figure 8:
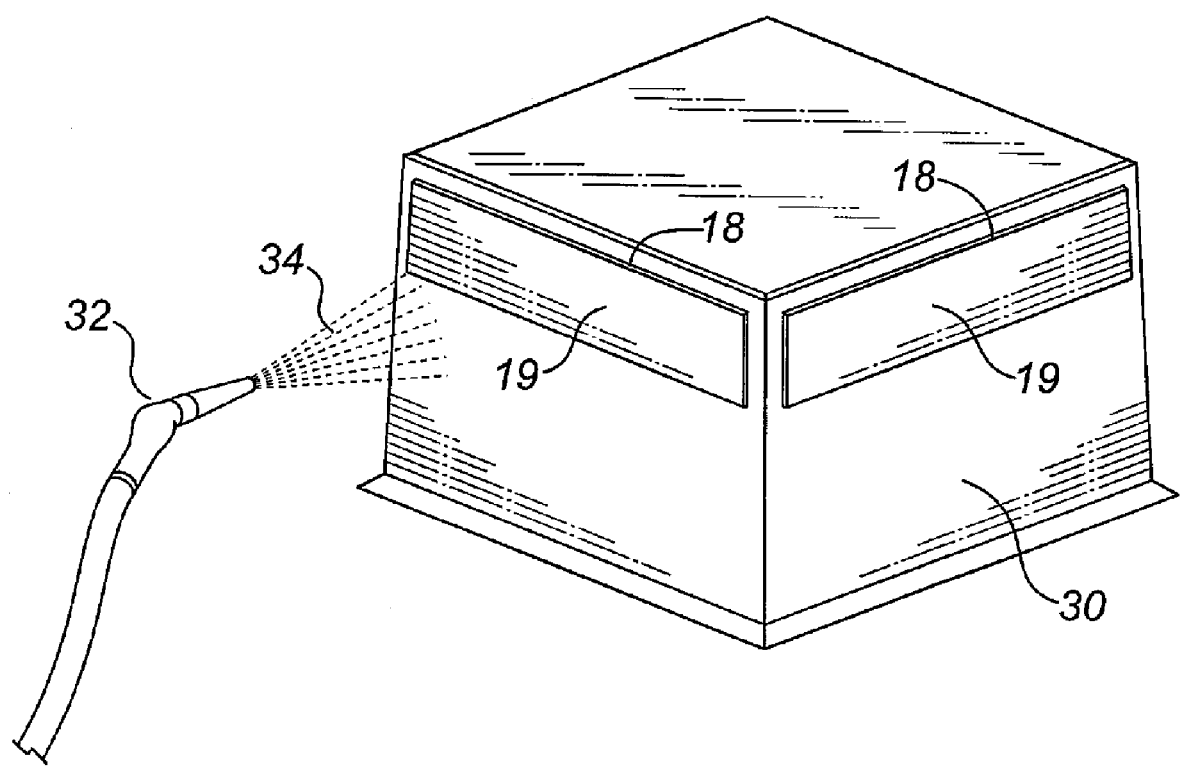
FIG. 8 is an isometric view of a mold used for making a containment sump comprising the present invention.

An example of a mold used to produce sump 10 is shown in FIG. 8. Mold 30 is a mold upon which liquid thermoset plastic resin, preferably including a reinforcement component such as fibreglass, is applied onto the exterior of mold 30 as well known by those skilled in the art to form a container taking the shape of mold 30. One such method of application is spraying fibreglass resin 34 onto mold 30 using a spray gun 32. Fibreglass resin 34 is a liquid thermoset plastic composite material including fibreglass reinforcement in the resin matrix.

Mold 30 is shown in an inverted position such that the top surface of mold 30 forms bottom 14 of sump 10. In producing the composite laminated sheet material of the present invention, one or more inserts 18 are placed on the side and/or bottom surfaces of mold 30 using temporary adhering means so as to hold inserts 18 in position when fibreglass resin 34 is applied onto mold 30. Fabric sides 19 of inserts 18 are placed facing outwards from mold 30 so that fibreglass resin 34 is sprayed directly onto fabric side 19 when sump 10 is being formed on mold 30. This allows inserts 18 to be placed on the interior surfaces of sump 10. Fibreglass resin 34 permeates fabric side 19 of inserts 18 as it is being sprayed onto mold 30. After sufficient fibreglass resin 34 has been sprayed onto mold 30 to form sump 10, sump 10 is left for a sufficient period of time to allow fibreglass resin 34 to set up and cure. As fibreglass resin 34 has permeated fabric side 19 of inserts 18, a strong mechanical bond is formed between inserts 18 and fibreglass resin 34 as fibreglass resin 34 cures. Once sump 10 has cured sufficiently, it is removed or released from mold 30.

While FIG. 8 is illustrated in a mold that is a "positive" in a sense that fibreglass resin 32 is sprayed onto the outside of mold 30, it should be obvious to those skilled in the art that a "negative" mold may be used where fibreglass resin 34 is sprayed onto the interior surface of a tub mold. In such an example, inserts 18 may be placed on the interior surfaces of the tub wall with fabric side 19 facing towards the interior space of the tub mold. Fiberglass resin 34 sprayed into the tub mold contacts fabric side 19 of inserts 18 and sets up in the manner described above thereby resulting in inserts 18 located on the exterior surfaces of sump 10.

When sump 10 has been formed, a pipe may enter into sump 10 through a pipe entry boot as shown in FIGS. 6 and 7. An opening, such as a circular hole (not shown) is cut through insert 18 and adjoining sidewall 12 of sump 10 of a sufficient size to allow inner pipe entry boot 26 to pass through said opening to join with outer pipe entry boot 24 thereby sandwiching insert 18 and sidewall 12 between them. Outer and inner pipe entry boots 24 and 26 are, preferably, made of the same thermoplastic as insert 18. Exemplary form of the present invention uses polyethylene as the thermoplastic. This allows flange 28, which forms part of inner boot 26, to be bonded to insert 18 using chemical bonding (solvent welding) or electro-fusion welding, both well known to those skilled in the art. If pipe 22 passing through the pipe entry boot into sump 10 is also made of the same thermoplastic, pipe 22 may also be chemically or electro-fusion welded to outer and inner pipe entry boots 24 and 26 thereby forming a leak-proof joint between pipe 22 and sump 10.

Figure 9A:
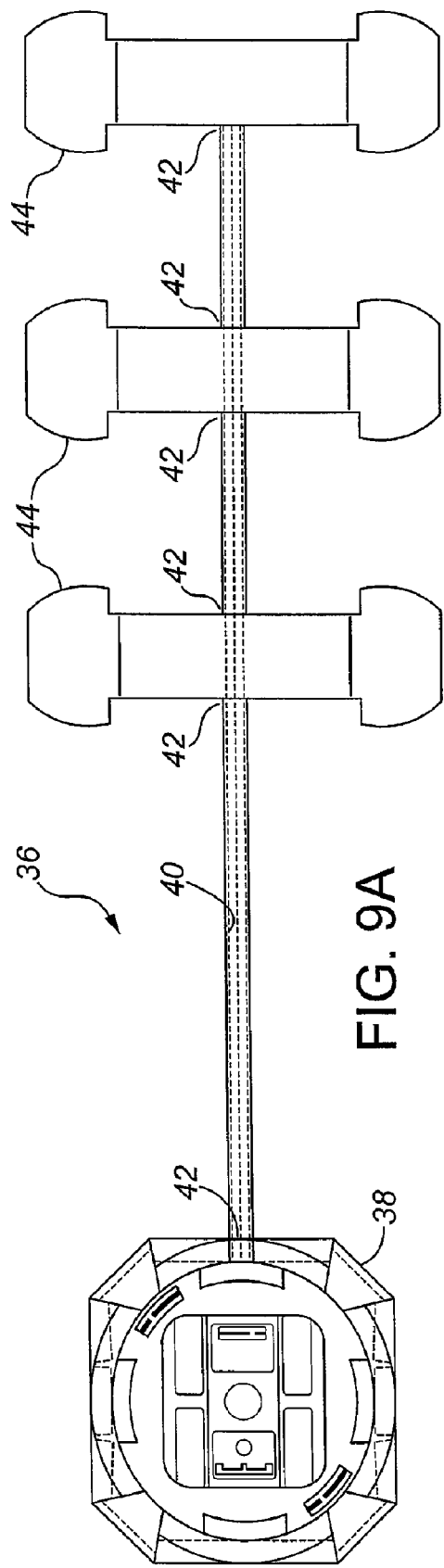
FIG. 9A is a top plan view of an underground chamber and sumps associated with three gas pump islands.
Figure 9B:
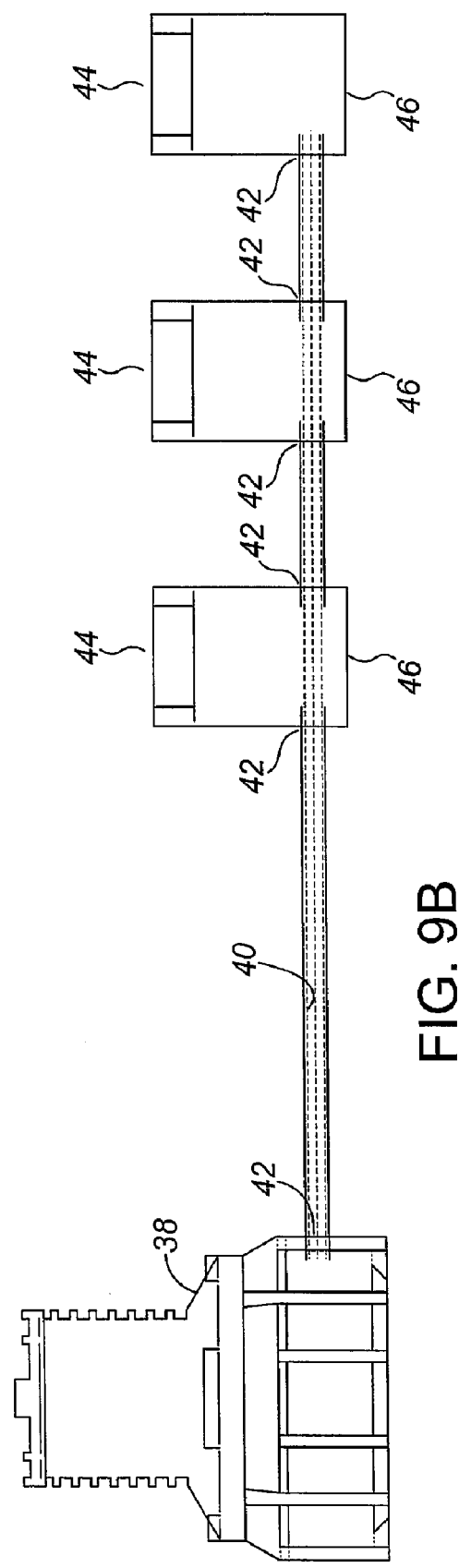
FIG. 9B is a side elevational view of an underground chamber and sumps associated with three gas pump islands.

Referring to FIGS. 9A and 9B, one application of a containment sump made of the present invention is illustrated. Shown is an underground pipeline system 40 connecting tank sump 38 to three gas pump islands 44. Located beneath each pump island 44 is a containment sump 46 having a composite laminating sidewall for attaching pipe entry boots 42.

Figure 10:
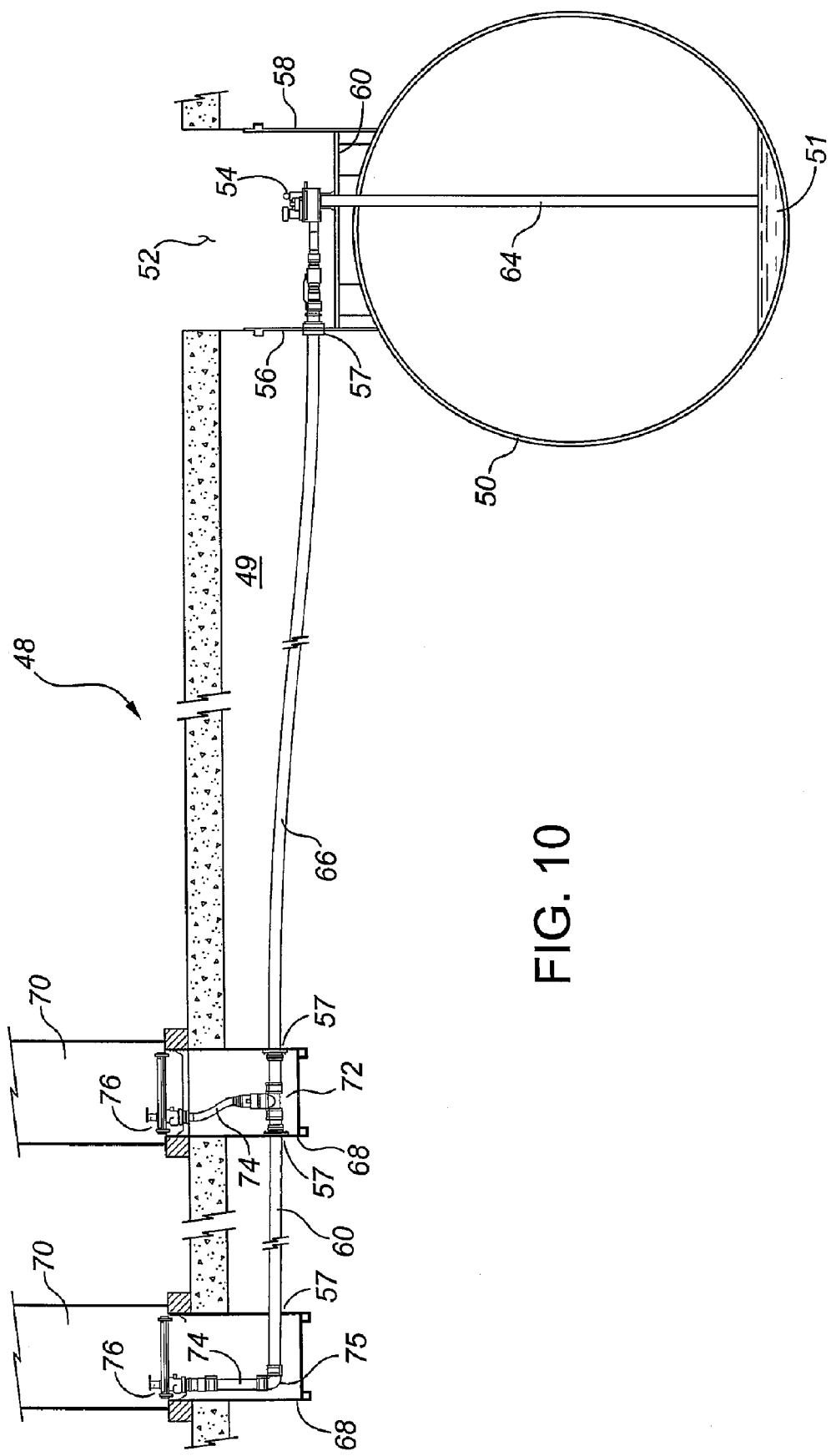
FIG. 10 is a partially cut-away side elevational view of an underground tank supplying fuel to a pair of gas pump islands.

Referring to FIG. 10, another application of containment sumps made of the present invention is shown. Underground tank 50 is buried in ground 49 and contains fuel 51. Bottomless containment sump 56 is attached to sump base 60 affixed to the top of tank 50. Pump 54 draws fuel 51 up tube 64 to deliver fuel 51 to pipeline 66. Fitting 57 fused to sidewall 58 of sump 56 provide a leak-proof joint between pipeline 66 and sump 56. Pipeline 66 travels through ground 49 to containment sump 68. Fittings 57 provide leak proof joints between pipeline 66 and each of sumps 68. Pipe risers 74 connect gas dispensers 70 via shear valves 76 to pipeline 66 either through tee joint 72 or elbow joint 75.

Although a few preferred embodiments have been shown and described, it will be appreciated by those skilled in the art that various changes and modifications might be made without departing from the scope of the invention. The terms and expressions used in the preceding specification have been used herein as terms of description and not of limitation, and there is no intention in the use of such terms and expressions of excluding equivalents of the features shown and described or portions thereof, it being recognized at the scope of the invention as defined and limited only by the claims that follow.

What is claimed is:

1. A containment sump comprising a side wall for providing a leak-proof seal with a thermoplastic pipe, the sump defining a pipe opening and comprising:
    (a) a pipe entry boot aligned with the pipe opening and made of a thermoplastic;
    (b) a containment sump side wall comprising a composite laminated sheet material comprising:
        (i) a thermoplastic layer having a layer of fabric bonded to substantially all of one side of said thermoplastic layer;
        (ii) a liquid thermoset plastic layer bonded to said fabric layer, and whereupon said liquid thermoset plastic curing to a thermoset plastic layer, said fabric layer bonds said thermoplastic layer to said thermoset plastic layer;
    (c) wherein the pipe entry boot is bonded to said thermoplastic layer of the composite laminated sheet material and said thermoplastic pipe.

2. A containment sump as set forth in claim 1 wherein said fabric layer is bonded to said thermoplastic layer by contacting said fabric layer to said thermoplastic layer when said thermoplastic layer is in a liquid state thereby allowing said liquid thermoplastic layer to permeate a portion of the thickness of said fabric layer prior to said thermoplastic layer reverting to a solidified state.

3. A containment sump as set forth in claim 2 wherein said thermoplastic is selected from the group consisting of polyethylene, polypropylene, polyvinylchloride, polyamide, polyvinylidene fluorid, ethylenchlortrifluorethylene, polytetrafluoroethylene, perfluoroalkoxy, fluorinated ethylene propylene and nylon.

4. A containment sump as set forth in claim 1 wherein said liquid thermoset plastic is selected from the group consisting of polyester resin, vinyl ester resin, epoxy resin and phenolic resin.

5. A containment sump as set forth in claim 4 wherein said liquid thermoset plastic further comprises fiberglass.

6. A containment sump as set forth in claim 1 wherein said fabric layer is comprised of polypropylene, polyester or glass.

7. A containment sump as set forth in claim 1 wherein said pipe entry boot is electrofusion-welded or solvent-welded to said thermoplastic layer side of said composite laminated sheet material.

8. The containment sump of claim 1 which is a containment sump, storage tank or process vessel.

* * * * *